United States Patent [19]

Scag et al.

[11] Patent Number: 4,967,543
[45] Date of Patent: Nov. 6, 1990

[54] LAWN MOWER

[75] Inventors: Dane T. Scag, Elm Grove; David Sugden, Horicon, both of Wis.

[73] Assignee: Scag Power Equipment, Inc., Mayville, Wis.

[21] Appl. No.: 419,133

[22] Filed: Oct. 10, 1989

[51] Int. Cl.⁵ .................. A01D 75/02; A01D 69/00
[52] U.S. Cl. .................................. 56/10.8; 56/10.9; 56/11.1
[58] Field of Search .............. 56/10.8, 10.9, 11.1, 56/10.1, 13.5, 14.7, 16.7, DIG. 7, DIG. 15; 180/6.48

[56] References Cited

U.S. PATENT DOCUMENTS

| | | | |
|---|---|---|---|
| 2,523,014 | 9/1950 | Gooch | 56/25.4 |
| 2,588,004 | 3/1952 | Holmes | 56/10.9 |
| 2,601,752 | 7/1952 | Rose | 56/26 |
| 2,766,834 | 10/1956 | Boyer | 180/6.48 |
| 3,616,869 | 11/1971 | Rilling | 180/6.48 |
| 3,946,543 | 3/1976 | Templeton | 56/10.9 |
| 4,043,416 | 8/1977 | Albright et al. | 180/6.48 |
| 4,327,539 | 5/1982 | Bricko et al. | 56/10.8 X |
| 4,667,459 | 5/1987 | Scanland et al. | 56/10.8 X |
| 4,753,062 | 6/1988 | Roelle | 56/10.8 X |
| 4,787,195 | 11/1988 | Wenzel | 56/11.1 |
| 4,835,949 | 6/1989 | Seyerle | 56/10.8 |

Primary Examiner—Thuy M. Bui
Attorney, Agent, or Firm—Fred Wiviott

[57] ABSTRACT

A lawn mower has a hydraulic motor mounted on each drive wheel and each motor is independently driven by a separate pump. Each pump includes a control lever for regulating fluid pressure and flow direction so that each wheel may be driven independently in the forward and reverse directions and at varying speeds. A speed control index is mounted on one side of the mower for releasably setting and maintaining the speed control levers in a plurality of equal forward speed positions so that the operator can preset the maximum forward speed. In addition, an individual speed control lever is mounted on each handgrip and each is independently coupled to one of the control levers for individually adjusting each wheel for speeds less than the preset maximum or for setting either wheel drive pump in neutral or reverse. A neutral control assembly returns the pump control levers to a neutral position when the control levers are moved into neutral.

17 Claims, 2 Drawing Sheets

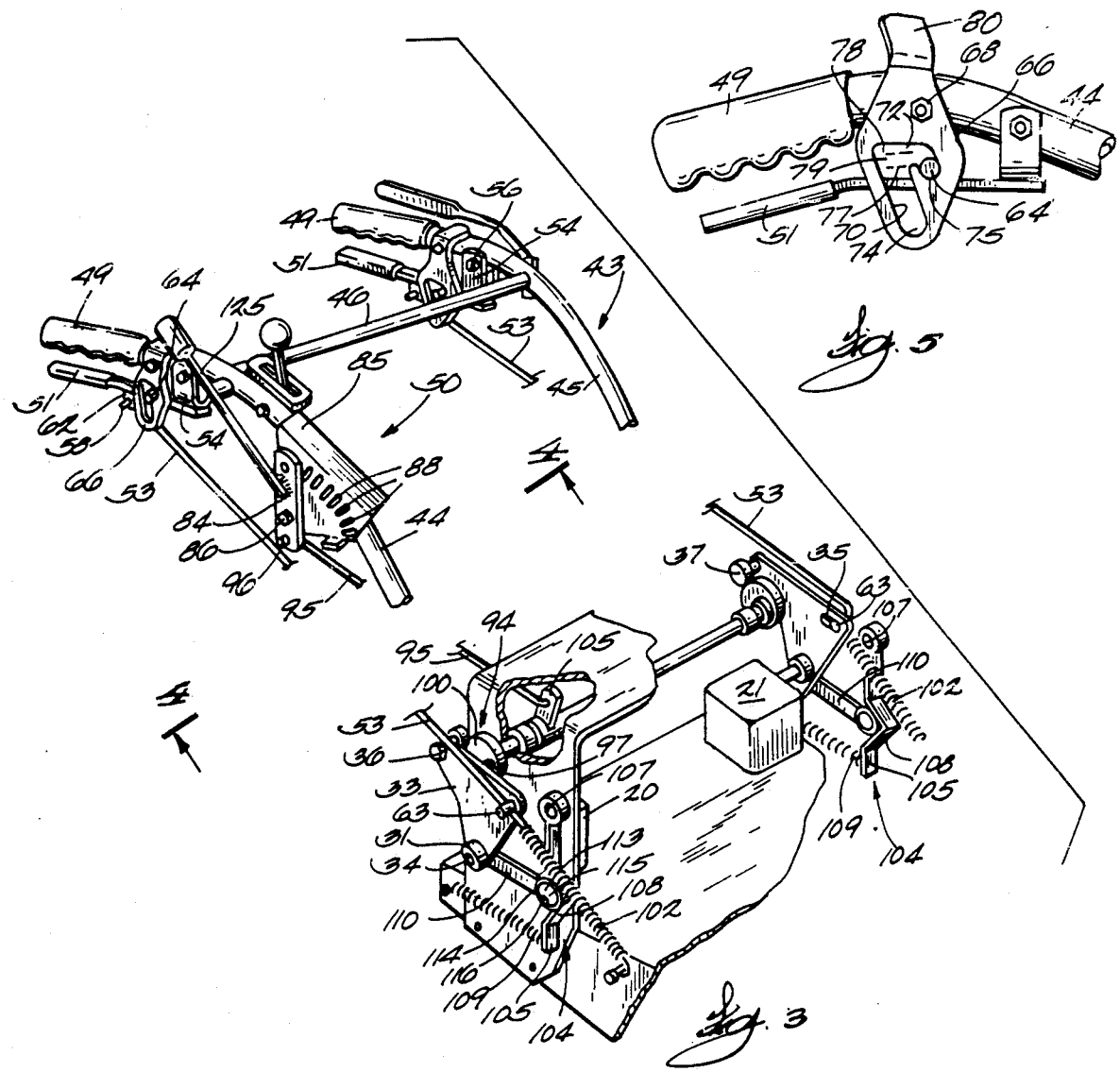
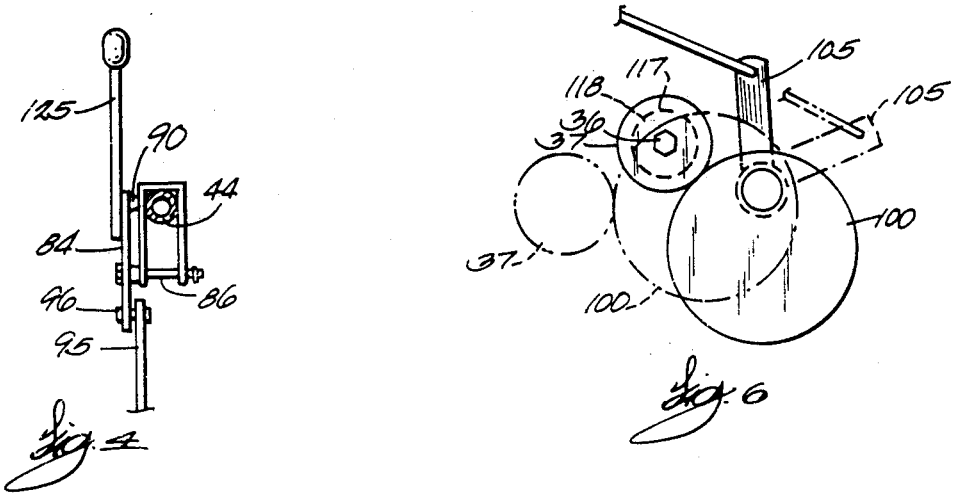

LAWN MOWER

BACKGROUND OF THE INVENTION

This invention relates to lawn mowers and more particularly to hydraulically driven lawn mowers.

One type of hydraulically driven lawn mower, such as that disclosed in U.S. Pat. No. 3,616,869, includes a pair of drive wheels each of which is independently operated by an individual pump coupled to the mower's engine. Each pump includes a control lever for regulating fluid pressure to each motor and the direction fluid flow. In this manner, the drive wheels can be independently rotated at selected forward and reverse speeds whereby the mower may be driven either forwardly or in reverse and may be turned through various angles. Hand levers on the mower are manipulated for moving the control levers into the desired positions. A friction type pivot is disclosed in U.S. Pat. No. 3,616,818 for holding the hand levers in selected forward drive positions.

In walking type lawn mowers, the operator must maintain contact with handgrips at the rear of the mower to facilitate manipulation and control. For this reason, it has been suggested that hand operated control levers for each of the drive wheel pumps be mounted for pivotal movement on the mower's handgrips. This has not been wholly satisfactory, however, because the operator is required to exert hand pressure on the levers in order to maintain the desired speed. This causes fatigue, particularly when the mower is used for long periods, such as in the case of commercial operation. In addition, it is difficult to control manually both pumps so that both wheels are driven at the same forward speed.

SUMMARY OF THE INVENTION

It is an object to provide a new and improved hydraulically driven lawn mower or similar device.

A further object of the invention is to provide a hydraulically driven lawn mower or similar device wherein various forward speeds can be maintained without hand fatigue.

Another object of the invention is to provide a control for a hydraulically driven lawn mower which is easy and convenient to use.

A still further object of the invention is to provide a hydraulically driven lawn mower having speed control levers mounted on the mower handgrips and which are not easily dislodged.

Yet another object of the invention is to provide a hydraulically driven lawn mower which can be set in a neutral drive state regardless of minor misalignment in the control linkage.

Still another object of the invention is to provide a hydraulically driven lawn mower wherein the drive wheels can be set to operate at uniform forward speeds without operator fatigue and wherein the wheel speeds can be individually adjusted or set in neutral or reverse.

These and other objects and advantages of the present invention will become more apparent from the detailed description thereof taken with the accompanying drawings.

In general terms the invention comprises a lawn mower having a pair of drive wheels, a reversible hydraulic motor coupled to each drive wheel for rotating the same, a pair of simultaneously driven pumps with one of the pumps being connected to each drive wheel, and control means coupled to each pump for controlling the pressure and fluid flow direction between the pump and its associated motor whereby each drive wheel can be driven at various speeds in the forward and reverse directions. Each control means includes a control lever coupled to each pump and operable upon being pivoted in a first direction to increase fluid pressure from said pump in a forward direction and being operative upon pivotal movement in the opposite direction to decrease fluid flow to a neutral point where fluid flow ceases and thereafter increasing fluid flow in the reverse direction upon further pivotal movement. Speed control means is coupled to both control levers for simultaneously setting both control levers for operating both pumps at the same forward speed and for individually operating both at slower forward speeds, in neutral or reverse.

BRIEF DESCRIPTION OF THE DRAWINGS

FIG. 3 is a perspective view illustrating the speed control assembly of the lawn mower according to the present invention;

FIG. 4 is a view taken along lines 4—4 of FIG. 3;

FIG. 5 is a side view of a first portion of the speed control assembly shown in FIG. 3; and FIG. 6 is a side view of a second portion of the speed control assembly illustrated in FIG. 3.

DETAILED DESCRIPTION OF THE PREFERRED EMBODIMENT

Figure 1:
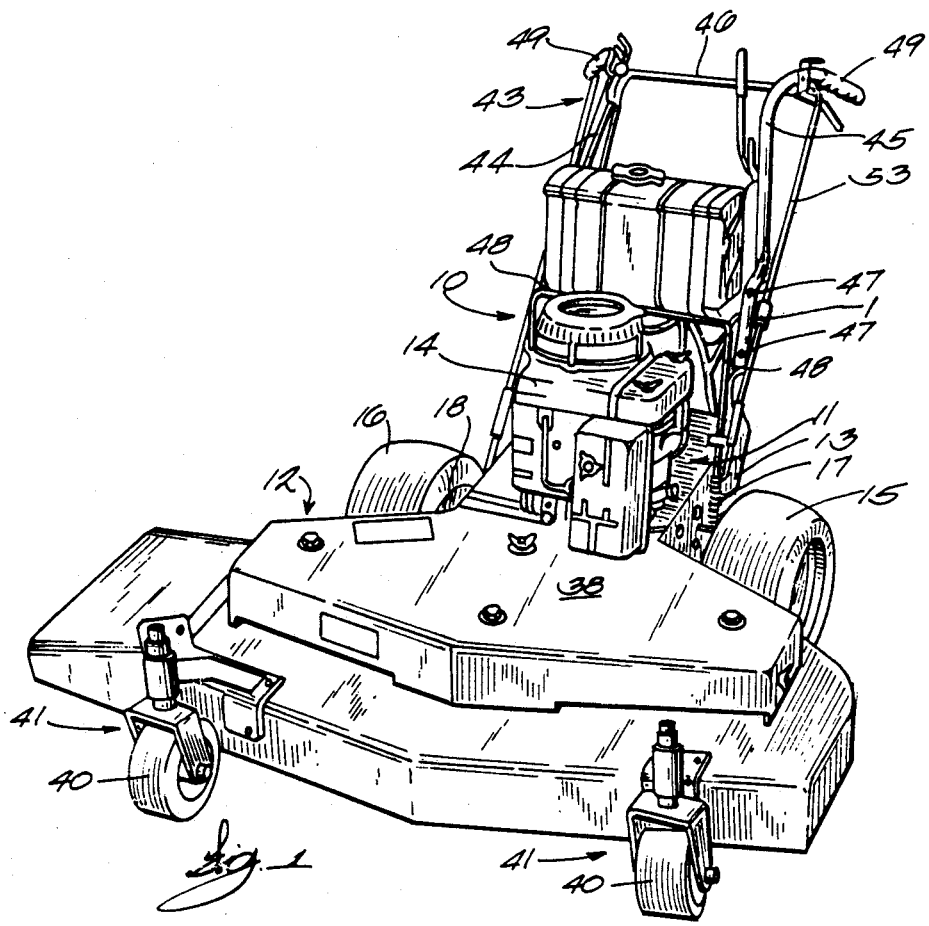
FIG. 1 is a perspective view of a lawn mower incorporating the present invention.
Figure 2:
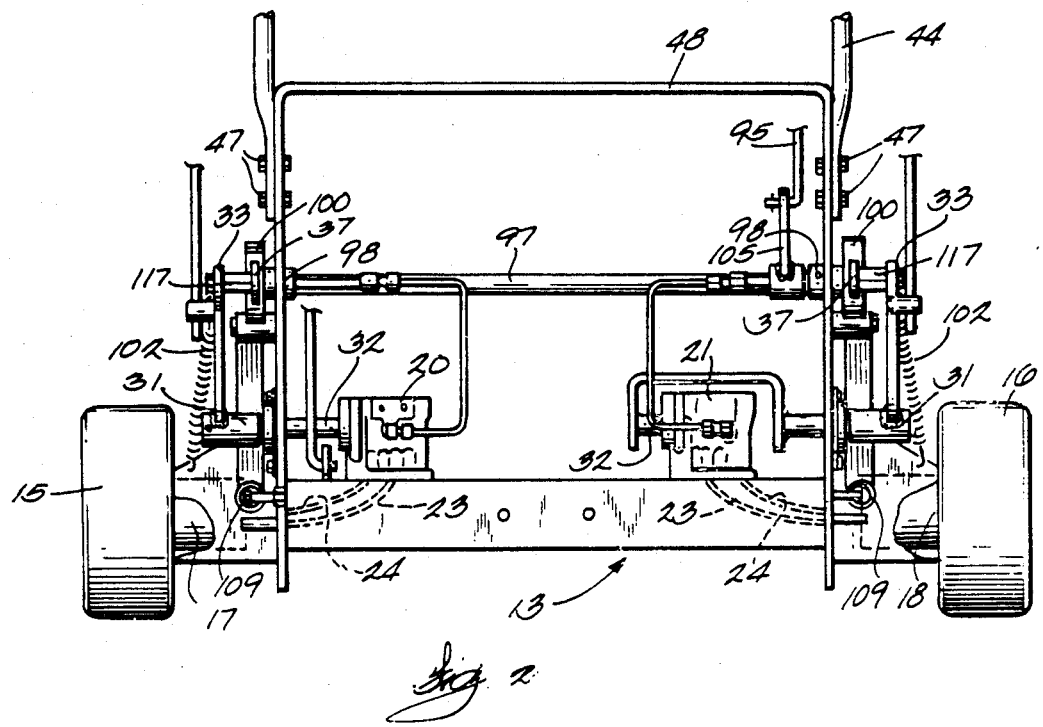
FIG. 2 illustrates a rear view of a portion of the lawn mower according to the invention.

The power lawn mower 10, according to the preferred embodiment of the invention as illustrated in FIGS. 1 and 2 includes a drive assembly 11 and a cutter assembly 12. The drive assembly 11 includes an engine deck 13 for supporting a conventional gasoline engine 14. A pair of drive wheels 15 and 16 are mounted on cutter deck 13 and generally on each side of the engine 14. Hydraulic motors 17 and 18 are mounted on wheels 15 and 16, respectively. Pumps 20 and 21 are mounted on engine deck 13 and are respectively connected to motors 17 and 18 through hydraulic conduits 23 and 24. The pumps 20 and 21 are driven at the same speed from the engine 14 by any conventional means such as, for example, a belt drive (not shown). Those skilled in the art will appreciate that such belt drives may include a belt which extends around a first pulley mounted on the engine shaft and pulleys mounted on shafts extending downwardly from pumps 20 and 21.

Each pump 20 and 21 also has a pump control shaft 32, extending therefrom and each has a pump control lever 33 fixed to its outer end. In particular, each lever 33 has an integral bushing 31 at its lower end and which is suitably fixed to shaft 32 extending from each pump 20 and 21. The pump control levers 33 are mirror images and are shown more particularly in FIG. 3 to be generally triangular with one corner fixed to shaft 34. Each lever 33 also has a short slot 35 formed adjacent the forward corner. At the third corner of the lever 33 there is a bushing 36 which supports a roller 37 as will be described more fully below.

The cutter assembly 12 includes a cutter deck 38 suitably mounted at the front of the engine deck 13. Mounted below the cutter deck 38 is one or more cutter blades (not shown) which rotate in a horizontal plane on vertical shafts (not shown) coupled to the engine 14 in any suitable manner, such as a belt drive assembly (not shown). The cutter assembly 12, its associated drive and the engine 14 are conventional and, accordingly, these parts will not be discussed in detail for the sake of brevity.

A second pair of wheels 40 are mounted at the front of the cutter deck 38 by means of castor assemblies 41 which permit the mower to be turned by the rear wheels 15 and 16 as will be discussed more fully below. A handle assembly 43 is provided for handling and manipulating the mower 10 and consists of a pair of handle members 44 and 45 and a cross member 46 secured adjacent the upper end of handle members 44 and 45 to hold the same in a generally parallel, spaced-apart relation. Each handle member is also suitably fixed, such as by bolts 47 to a U-shaped frame member 48 mounted on the engine deck 13. The handle members 44 and 45 extend upwardly and rearwardly from frame member 48 and each has a downward curve at its remote end for receiving a handgrip member 49.

A speed control assembly 50 is located on the handle members 44 and 45 as shown more particularly in FIG. 5 and includes a speed control lever 51 pivotally mounted on each handle member 44 and 45 and each is coupled to one of the pump control levers 33 by a control rod 53. The levers 51 are generally bar-like and each is fixed to the lower ends of a generally U-shaped bracket 54 the upper ends of which are pivotally mounted by means of a pin 56 received in a suitable opening in the handle members 44 and 45 and forwardly of the handgrip 50. Control rod 53 is elongate and its upper end 58 is bent laterally at right angles for being received in an opening 60 formed in an ear 62 fixed to and extending downwardly from the underside of control lever 51 and adjacent bracket 54. A pin 63 is fixed to the lower end of rod 53 and extends laterally therefrom into the slot 35. A control finger 64 is also mounted on control lever 51 and extends laterally outwardly therefrom at a point generally above ear 62. The control lever 33 shown in FIG. 3 is mounted on pump 20. It will be appreciated that the lever 33 mounted on pump 21 is a mirror image of that mounted on pump 20.

Mounted adjacent the control lever 51 on each of the handle members 44 and 45 is a speed control index 66. The speed control indexes 66 on each side of the mower are identical except that each is a mirror image of the other. The right hand speed control index is shown in FIG. 5 and will now be described. The left hand speed control index is shown in FIG. 3 and corresponding parts have the same reference numerals as the index shown in FIG. 4.

Each speed control index 66 is a relatively flat, pear shaped member pivotally mounted on the outer side of the respective handles 44 or 45 by means of pins 68 with the control fingers 64 extending into the sectors 70. A friction bushing (not shown) is disposed between each index 66 and the pins 68 to retain the indexes 66 in their respective positions unless manually reset. An indexing slot 70 is formed in index member 66 adjacent its larger end. A first edge 72 of slot 70 is generally linear and extends laterally relative to the pivot axis of pin 68. The opposite side of slot 70 has a shaped configuration which defines pockets 74 and 75 which are complementary to the outer surface of the control fingers 64. Pocket 74 is located farther from the axis of pin 68 than the pocket 75. The index 66 defines neutral, full forward, and reverse drive positions. In addition, the broken lines 77 and 78 define an arcuate neutral zone 79 spaced from edge 70 and pocket 74 and having its center of curvature at the axis of pin 68 and intersecting the neutral pocket 74. The length of slot 35 on pump control lever 33 is equal to the width of the neutral zone 79 for reasons which will be discussed below. At the end of speed control index 66 opposite the slot 70 there is a thumb lever 80.

The speed control assembly 50 also includes a master speed control lever 84 pivotally mounted intermediate its ends on a support bracket 85 suitably fixed to one of the handles 44 or 45, although preferably on the handle 44 at the right side of the apparatus as shown in FIG. 3. Bracket 85 generally has an inverted U-shape and transverse cross-section with its sides embracing handle 44. Lever 84 is pivotally mounted by means of a pin 86 adjacent the lower end of bracket 85. At the upper end of bracket 85, there are a plurality of slots 88 which are equally spaced apart and arranged in an arc whose center of curvature is at the axis of pin 86. A detent 90 is mounted adjacent the upper end of lever 84 and on the inner side thereof for cooperating with the slots 88 whereby lever 84 can be retained in each of a plurality of forward speed positions corresponding to the slots 88. The lower end of lever 84 is coupled to a cam assembly 94 by an elongate rode 95 which is pivotally connected to the lower end of lever 84 by a pin 96.

Cam assembly shown in FIGS. 2, 3 and 6 includes a shaft 97 mounted for rotation about a horizontal axis by means of bushings 98 mounted on the sides of frame member 49 and about a pair of aligned openings formed therein. Mounted on each of the ends of shaft 97 and adjacent the outer surface of the sides of member 48 are a pair of identical cams 100. As seen more particularly in FIG. 6, each cam 100 has a generally circular profile and is eccentrically mounted on shaft 97. The rollers 37 on the pump control levers 33 bear against the surface of each cam 100 under the influence of a spring 102 extending between the end of the pump control rods 53 and the engine deck 13. The rod 95 is pivotally connected at its end remote from lever 84 to an arm 105 extending from cam shaft 97.

The lever 84 controls the forward speed of the lawn mower by pivoting the pump control lever 33 through the agency of the cams 100 and the rollers 37. With particular reference to FIGS. 3 and 6, when the lever 84 is pivoted counterclockwise to its position shown in FIG. 3, its lower end will move toward the right thereby rotating camshaft 97 and consequently rotating cams 100 counterclockwise from its position shown by full lines to its position shown by broken lines in FIG. 6. As a result, the roller 37 will move from a lower point on the profile of cam 100 to a higher point, thereby causing the lever 33 to pivot in a counterclockwise direction (FIG. 3) so as to increase the forward speed. Conversely, pivotal movement of lever 84 in a counterclockwise direction will move the lower end of lever 84 toward the left as viewed in FIG. 3, thereby rotating the cams 100 counterclockwise so as to rotate pump control lever 33 counterclockwise which reduces motor speed. The detent 90 and slots 88 permit the lever 84 to be resiliently maintained in a plurality of forward speed positions. In order to insure that the cams 100 will coact equally with pumps 20 and 21, the rollers 37 are adjustable by means of an eccentric 117. In particular, eccentric 117 includes a first eccentrically mounted pin 118 which is threaded (not shown) in a suitable opening in the lever 33. A second pin 119, which is axially positioned on eccentric 117, rotatably supports the roller 37. It can thus be seen that by securing eccentric 117 in different angular positions, the distance between the axis of roller 37 and cam 100 can be adjusted.

The cams 100 on each side of the lawn mower are identical and interconnected so that both drive wheels 15 and 16 will be driven at the same forward speeds when lever 75 is repositioned. Once a forward speed has been set, the operator can operate the mower safely at that speed without either of the wheels creeping and without further handling of lever 84. In order to facilitate positioning of lever 84, an extension arm 125 may be secured to the upper end of lever 84 and extending backwardly therefrom to a position adjacent the handgrips 49. However, it is not necessary for the operator to maintain a hold on lever 125 once the desired speed position has been set.

As seen in FIG. 3, the line of action of spring 102 is generally along the axis of rod 53. When the speed control lever 51 is in its full forward speed position, that is, with finger 64 in pocket 74, spring 102 urges the forward end 58 of rod 53 into engagement with the forward end of slot 35 thereby tending to rotate the lever 33 clockwise as viewed in FIG. 3. However, when speed control lever 51 is in its neutral position, i.e. when finger 64 is in pocket 74, the end 58 of rod 53 should be out of engagement with the ends of slot 35.

A neutral adjustment assembly 104 as seen in FIG. 3 is provided for returning lever 33 to its neutral position and maintaining said position so that the end 58 of control rod 53 will be positioned intermediate the ends of slot 35 when lever 51 is in its neutral position or finger 64 is in pocket 74.

The assembly 104 includes a bar 105 pivoted at one end on frame member 49 by pivot pin 107 which is adjacent the upper edge of pump control lever 33. Lever 105 extends downwardly from its pivot pin 107 and has a V-shaped section 108 intermediate its ends. A spring 109 extends between the lower end of bar 106 and the engine deck 13 for urging the bar 106 clockwise around its pivot 105. In addition, a short bar 110 is fixed to busing 34 and extends laterally therefrom. An eccentrically mounted roller 113 is rotatably mounted at the free end of bar 110 and its contact surface engages the flat sides of the V-shaped section 108. In particular, roller 113 includes an outer race 114 and an inner race 115 having an eccentrically located opening formed therein. A bolt 116 extends through the opening in race 114 and through an aligned opening (not shown) in the end of bar 110. As those skilled in the art will appreciate, caged balls are located between the races 114 and 115.

Those skilled in the art will also appreciate that shafts 34 are coupled at their inner ends to flow control and directional valves (not shown) which are mounted within the housing of each pump. The internal control valves are conventional and need not be described in detail. It is sufficient to understand the invention to state that, for example, as the control lever 33 is pivoted clockwise as viewed in FIG. 3, fluid pressure to the motor 20 will increase thereby increasing the rotational speed of wheel 15. Conversely, as the lever 33 is pivoted counterclockwise, fluid flow to pump 20 will decrease until such time as a neutral zone is reached wherein fluid flow to the motor 20 will cease. Further pivotal movement in a clockwise direction will reverse fluid flow in conduits 23 and 24 so that the motor 20 will begin to rotate in the reverse direction and the reversal speed will increase as the lever 33 pivots further. Pump 21 will be operated by its associated lever 33 in an identical manner.

In operation, when the engine 14 is running, the pumps 20 and 21 will be driven at the same speed. Hydraulic fluid under pressure will be delivered to motors 17 and 18 through conduits 23 and 24. When the direction of fluid flow is to the motor 17 and 18 through conduits 23 and return flow to the pumps 20 and 21 is through conduit 24, each of the motors will be driven in the forward direction so that the drive wheels 15 and 16 will be correspondingly driven. On the other hand, fluid flow in the opposite direction will cause the motor 17 and 18 to operate in the reverse direction whereby the respective wheels will be driven rearwardly.

The force of spring 102 is larger than spring 109 so that spring 102 must be disconnected when the neutral position of lever 33 is being adjusted. Initially, lever 33 is assembled to shaft 32 such that it will be in approximately the proper position wherein the roller 113 will be at the base of the V-section 108 of bar 106 when shaft 32 is in the neutral position of the internal control valves (not shown) and the pin 63 at the end of rod 53 is in slot 35 and spaced from its ends. By releasing the roller 113 and rotating the inner race 115 relative to the end of bar 110, the position of the roller can be adjusted so that it will be at base of section 108 when the shaft 32 in its neutral position. It will be appreciated that the inner race 115 may then be fixed in its adjusted position by means of bolt 116.

It is extremely important that the pin 63 be located intermediate the ends of slot 35 when the control finger 64 is in the neutral zone 79 of index 66 and the shaft 32 is in its neutral position. The length of rod 53 may be adjusted by means of turnbuckles 121 which are disposed intermediate the ends of rods 53. After the length of rods 53 have been adjusted, the assembly 104 will be operative to return the lever 33 to its neutral position so that the pin 63 is intermediate the ends of slot 35 when the finger 64 is in the neutral zone 79 or in the pocket 75. By coupling the control rod 53 to lever 33 through slot 35 and by insuring that the pin 63 is out of contact with the edges of slot 35 when the lever 33 is in its neutral position, slight misalignment will not cause the lawn mower to begin moving in either the forward or reverse directions when the operator has set the indexing assembly in the neutral position. The operator must intentionally move the finger 64 out of the pocket 74 or the neutral zone 82 in order to commence operation of the forward or reverse direction.

Upon movement of finger 64 out of pocket 74, rotation of the index 66 to a desired position, and release of the handle 51, the pin 63 at the end of rod 53 will be free to be moved into engagement with the front edge of slot 35 by spring 102. When the operator wishes to drive the wheels forwardly, for example, the control lever 51 will be pivoted counterclockwise as viewed in FIG. 4 and about pin 56 thereby moving finger 64 from pocket 75. The operator may then push on thumb lever 120 to pivot the index 66 until the pocket 74 is moved into alignment with pin 64. The operator may then release the control lever 51 and the spring 94 acting through the rod 53 move the finger 64 into pocket 64. Forward speed of both wheels 15 and 16 will then be determined by the position of the lever 84.

When the index 66 is being moved between the neutral and forward positions, the pin 64 will be held in the neutral zone 77 so that the assembly 104 will return lever 33 to its neutral position whereby wheels 15 and 16 will not be driven during the shifting operation. If the wheels are being driven at any forward speed, the operator can, by pulling back on either of the levers 51 to move either or both of the pins 64 back into the neutral zones whereby the assemblies 104 will be free to reposition levers 33 in their neutral positions and the wheels will come to rest. If it is desired to drive either of the wheels 15 or 16 in the reverse direction when they are in any of their forward speeds, the appropriate lever 51 is pivoted counterclockwise to move its finger 64 through the neutral zone and into the reverse zone at the inner edge of slot 70. The wheel will thus slow, come to rest, dwell in the neutral position and then reverse as the pin 63 at the end of rod 53 traverses the slot 35 and moves into engagement with the rear edge thereof.

The edge 72 limits reverse speed. It will be appreciated that in order to operate wheel 15 in the reverse direction the operator must maintain pressure on lever 51. If the operator should stumble or walk into an obstacle, so that he releases his grip on lever 50, wheel 15 will begin to rotate in the forward direction and away from the operator.

The speed controls at the opposite sides of the mower operate identically for driving wheels 15 and 16 in forward or reverse directions and at varying speeds. In normal operation, the operator will set the speed control indexes 66 at each side of the mower in forward or neutral positions. It is necessary that the wheels 15 and 16 be driven at the same speed for the mower to travel in relatively straight line. If a turn is desired, the wheel at the outside of the turn is driven at a faster speed than that at the inside of the turn or the inside wheel is stopped or driven in the opposite direction. The radius of the turn will be determined by the different relative speeds of the inside and outside wheels. Therefore, in order to affect a turn, the operator will change the relative speeds of the inside and outside wheels by rotating the lever 51 at the inside of the turn.

The speed control index 66 permits the mower to be driven at any forward speed without the necessity for the operator applying pressure to the control levers 51 and still permits different relative forward speeds of the wheels 15 and 16 so that turns of varying radii can be achieved. Return of the pump control lever to its neutral position when the control lever 104 is moved to neutral is insured by the neutral control mechanism 104.

While only a single embodiment of the invention has been illustrated and described, it is not intended to be limited thereby but only by the scope of the appended claims.

We claim:

1. A lawn mower having a pair of drive wheels, a reversible hydraulic motor coupled to each drive wheel for rotating the same, a pair of pumps simultaneously driven with one of said pumps being connected to each hydraulic motor, and control means coupled to each pump for controlling the pressure and fluid flow direction between each of said pumps and its associated motor whereby each drive wheel can be driven at various speeds in the forward and reverse directions, each control means including a control element coupled to each pump and operable upon being moved in a first direction to increase fluid pressure from the pump to which it is coupled for driving its associated wheel in a forward direction and being operative upon movement in the opposite direction to decrease fluid flow to a neutral state where fluid flow ceases and thereafter increasing fluid flow in the reverse direction upon further movement, first adjustable control means coupled to said control elements for simultaneously setting both control elements in one of a plurality of forward speed positions, and second and third control means for independently adjusting each control element through speed ranges from the forward speed set by the first control means through the neutral and reverse speed positions.

2. The lawn mower set forth in claim 1 wherein each of said control elements comprises a control lever mounted on its respective pump, wherein pivotal movement of one of said control levers in a first direction will increase fluid pressure from its associated pump for driving its associated wheel in a forward direction and pivotal movement in the opposite direction will decrease fluid flow, said levers having an intermediate neutral position, first coupling means for coupling said first control means to each of said control levers, and second and third coupling means for independently coupling said second and third control means to said control levers, respectively.

3. The lawn mower set forth in claim 2 wherein said first coupling means includes first and second cam means connected to said first control means and operative to be oriented in a plurality of positions by said first control means, said first coupling means also including cam follower means on each of said control levers and each being disposed in engagement with one of the came means whereby the pivotal position of said control levers will be controlled by the orientation of the cam means.

4. The lawn mower set forth in claim 3 wherein said first coupling means includes shaft means rotatably mounted on said lawn mower, said first and second cam means being mounted on said shaft means, said first control means being coupled to said shaft means for rotating the same whereby said first and second cam means will be simultaneously oriented in one of said plurality of positions.

5. The lawn mower set forth in claim 4 wherein each of said second and third control means is coupled to said control levers by lost motion means whereby when said control levers are in their neutral positions, incremental movement of said second or third control means in either direction will be inoperative to cause said pumps to move out of their neutral positions, and neutral position resetting means coupled to said control levers and being operative to retain said control levers in their neutral positions when the second and third control means are in their neutral positions, respectively.

6. The lawn mower set forth in claim 5 and including biasing means urging said second and third coupling means in a forward direction.

7. The lawn mower set forth in claim 6 and including a pair of handgrip means adjacent the rear of said mower for manipulating the same, said second and third control means comprising lever means mounted on said handgrips respectively.

8. The lawn mower set forth in claim 7 wherein said first adjustable control means includes a speed control lever pivotally mounted on one of said handle means, link means coupling said speed control lever to said cam means for rotating the same, and indexing means for resiliently holding said speed control lever in each of a plurality of angular positions.

9. The lawn mower set forth in claim 1 and including first and second cam means coupled to said first control means and operative to be oriented in a plurality of positions by said first control means, cam follower means on each of said control elements and each being disposed in engagement with one of the cam means whereby the pivotal position of said control levers will be controlled by the orientation of the cam means.

10. The lawn mower set forth in claim 9 and including shaft means rotatably mounted on said lawn mower, said first and second cam means being mounted on said shaft means, said first control means being coupled to said shaft means for rotating the same whereby said cam means will be simultaneously oriented in one of said plurality of positions.

11. The lawn mower set forth in claim 10 wherein said first adjustable control means includes a speed control lever pivotally mounted on said mower, link means coupling said speed control lever to said shaft means for rotating the same, and indexing means for resiliently holding said speed control lever in each of a plurality of angular positions.

12. The lawn mower set forth in claim 1 and including biasing means urging said second and third control means in a forward direction.

13. The lawn mower set forth in claim 1 and including a pair of handgrips means adjacent the rear of said mower for manipulating the same, said second and third control means comprising lever means mounted on said handgrips, respectively.

14. The lawn mower set forth in claim 1 wherein each of said second and third control means is coupled to said control elements by lost motion means whereby when said control elements are in their neutral positions, incremental movement of said second or third control means in either direction will be inoperative to cause said pumps to move out of their neutral positions, and neutral position resetting means coupled to said control elements and being operative to retain said levers in their neutral positions when the second and third control means are in their neutral positions.

15. A lawn mower having a pair of drive wheels, a reversible hydraulic motor coupled to each drive wheel for rotating the same, a pair of simultaneously driven pumps with one of said pumps being connected to each hydraulic motor, and first control means coupled to each pump for controlling the pressure and fluid flow direction between said pump and its associated motor whereby each drive wheel can be driven at various speeds in the forward and reverse directions, said control means including a control lever coupled to each pump and operable upon being pivoted in a first direction to increase fluid pressure from said pump in a forward direction and being operative upon pivotal movement in the opposite direction to decrease fluid flow to a neutral point where fluid flow ceases and thereafter increasing fluid flow in the reverse direction upon further pivotal movement, second control means for simultaneously adjusting both of said control levers in the same forward speed positions and second and third control means for individually adjusting said control levers through forward and reverse speeds other than said same forward speed.

16. The lawn mower set forth in claim 15 wherein said lawn mower includes a pair of handgrips, said second and third control means each comprising a speed control lever, one of said speed control levers being coupled to a different one of said control levers, said speed control levers being operative to vary the output of said pumps.

17. The lawn mower set forth in claim 16 and including means for releasably holding said first control means in each of its speed positions.

* * * * *

UNITED STATES PATENT AND TRADEMARK OFFICE
CERTIFICATE OF CORRECTION

PATENT NO. : 4,967,543
DATED : November 6, 1990
INVENTOR(S) : Dane T. Scag and David Sugden It is certified that error appears in the above-identified patent and that said Letters Patent is hereby corrected as shown below:

Column 10, lines 1 and 2, delete "control elements" and substitute --levers--.

Column 10, line 2, delete "levers" and substitute --control elements--.

Signed and Sealed this

Eleventh Day of August, 1992

Attest:

DOUGLAS B. COMER

*Attesting Officer*     Acting Commissioner of Patents and Trademarks